United States Patent
Matsunaga

(10) Patent No.: US 8,069,649 B2
(45) Date of Patent: Dec. 6, 2011

(54) EXHAUST EMISSION PURIFYING APPARATUS FOR ENGINE

(75) Inventor: Hideki Matsunaga, Ageo (JP)

(73) Assignee: Nissan Diesel Motor Co., Ltd., Ageo-shi, Saitama (JP)

( * ) Notice: Subject to any disclaimer, the term of this patent is extended or adjusted under 35 U.S.C. 154(b) by 424 days.

(21) Appl. No.: 12/422,139

(22) Filed: Apr. 10, 2009

(65) Prior Publication Data

US 2009/0193793 A1    Aug. 6, 2009

Related U.S. Application Data

(63) Continuation of application No. PCT/JP2007/063211, filed on Jul. 2, 2007.

(30) Foreign Application Priority Data

Oct. 12, 2006 (JP) .................................. 2006-278242

(51) Int. Cl.
    *F01N 3/00* (2006.01)

(52) U.S. Cl. ................. 60/277; 60/286; 60/295; 60/301; 60/303

(58) Field of Classification Search .................. 60/277, 60/286, 295, 301, 303
    See application file for complete search history.

(56) References Cited

U.S. PATENT DOCUMENTS

| | | | |
|---|---|---|---|
| 6,063,350 A | 5/2000 | Tarabulski et al. | |
| 7,658,093 B2 * | 2/2010 | Nishina et al. | 73/61.46 |
| 2007/0204678 A1 | 9/2007 | Nishina et al. | |
| 2007/0209428 A1 | 9/2007 | Nishina et al. | |
| 2007/0266697 A1 | 11/2007 | Nishina et al. | |

FOREIGN PATENT DOCUMENTS

| | | |
|---|---|---|
| JP | 2002-527660 | 8/2002 |
| JP | 2002-371831 | 12/2002 |
| JP | 2003-529011 T | 9/2003 |
| JP | 2005-127262 A | 5/2005 |
| JP | 3687915 B2 | 8/2005 |
| JP | 2006-125322 A | 5/2006 |
| JP | 2006-144657 A | 6/2006 |
| JP | 2006-177317 A | 7/2006 |
| WO | WO 00/75643 A1 | 12/2000 |
| WO | WO2006046367 * | 5/2006 |

* cited by examiner

*Primary Examiner* — Tu M. Nguyen
*Assistant Examiner* — Diem Tran
(74) *Attorney, Agent, or Firm* — McDermott Will & Emery LLP

(57) ABSTRACT

When a concentration measured by a sensor is lower than a predetermined threshold, it is judged that a liquid is any different type of aqueous solution, and also, it is judged whether or not the different type discrimination is adequate. When the discrimination is adequate, the number of different type discriminating times is counted up based on a predetermined counted value, and when the number thereof is equal to or larger than a determination threshold, the different type discrimination is determined. At this time, at least one of the predetermined counted value and the determination threshold is dynamically set based on a liquid level of a reducing agent tank, so that the counting and/or the different type discriminating determination is performed considering convection which is changed according to a level change to thereby discriminate with high precision whether or not the liquid is the different type of aqueous solution.

14 Claims, 11 Drawing Sheets

EXHAUST EMISSION PURIFYING APPARATUS FOR ENGINE

This application is a continuation of PCT/JP2007/063211, filed on Jul. 2, 2007.

FIELD

The present invention relates to a technology for discriminating with high precision whether or not a liquid stored in a reducing agent tank is any different type of aqueous solution which does not function as a reducing agent, in an engine exhaust emission purifying apparatus for reductively purifying nitrogen oxides ($NO_x$) in the exhaust emission (to be referred to as an exhaust emission purifying apparatus, hereunder).

BACKGROUND

There has been proposed an exhaust emission purifying apparatus in which a liquid reducing agent or its precursor is injection-supplied to an exhaust emission upstream side of a $NO_x$ reduction catalytic converter disposed in an engine exhaust system, so that $NO_x$ in the exhaust emission and the reducing agent are subjected to a catalytic-reduction reaction, to thereby reductively purify $NO_x$ into harmless components. In the exhaust emission purifying apparatus, when the concentration of the liquid reducing agent or its precursor is changed depending on some factor, there is a possibility that $NO_x$ purification efficiency in the $NO_x$ reduction catalytic converter is degraded, so that required $NO_x$ purification performance may not be obtained. In particular, if a mixing ratio between solute and solvent in the liquid reducing agent or its precursor is improper or if any different type of aqueous solution or water is mixed into the liquid reducing agent or its precursor, the above-mentioned problems are prominently caused. Therefore, as disclosed in Japanese Patent No. 3687915 (Patent literature 1), the applicant of the present invention has proposed a technology for, even if convection is generated in a liquid stored in a reducing agent tank, discriminating with high precision a liquid type of the liquid, by utilizing a concentration sensor which measures the concentration of a liquid reducing agent or its precursor based on temperature rise characteristics of a heating element.

CITATION LIST

Patent Literature

Patent Literature 1: Japanese Patent No. 3687915

SUMMARY

Technical Problem

However, in the conventionally proposed technology, although it is possible to discriminate with high precision the liquid type as long as a moving vehicle performs normal running, in a dump truck frequently running a punishing road for example, unexpected strong convection is generated in the liquid in the reducing agent tank, and therefore, the liquid type may be erroneously discriminated.

Therefore, in view of the above conventional problems, focusing on a phenomenon that the strength of convection is changed according to the liquid level in the reducing agent tank, the present invention has an object to provide an exhaust emission purifying apparatus capable of discriminating with high precision whether or not the liquid in the reducing agent tank is any different type of aqueous solution, even if strong convection is generated in the liquid.

Solution to Problem

Therefore, an exhaust emission purifying apparatus in accordance with the present invention includes: a reducing agent tank that stores a liquid reducing agent or its precursor; a reduction catalytic converter that reductively purifies nitrogen oxides in the exhaust emission by using the liquid reducing agent or its precursor in the reducing agent tank; a level measuring device that measures a level of the liquid reducing agent or its precursor in the reducing agent tank; a concentration measuring device that measures a concentration of the liquid reducing agent or its precursor based on temperature rise characteristics of a heating element obtained by operating the heating element disposed in the reducing agent tank for a predetermined time; and a control unit incorporating therein a computer. Then, the control unit executes: a different type discriminating process of discriminating that the liquid reducing agent or its precursor is any different type of aqueous solution which does not function as a reducing agent when the concentration measured by the concentration measuring device is lower than a predetermined threshold; an adequacy judging process of judging, based on a temperature of the heating element and a temperature change rate thereof, and also, the concentration measured by the concentration measuring device, whether or not the different type discrimination is adequate, when it is discriminated in the different type discriminating process that the liquid reducing agent or its precursor is the different type of aqueous solution; a first counting process of counting up the number of different type discrimination times based on a predetermined counted value when it is judged in the adequacy judging process that the different type discrimination is adequate; a first different type discrimination determining process of determining the different type discrimination when the number of different type discriminating times counted in the first counting process is equal to or larger than the first predetermined number of times; and a first setting process of dynamically setting at least one of the predetermined counted value and the first predetermined number of times, based on the level measured by the level measuring device.

Advantageous Effects of Invention

By virtue of the exhaust emission purifying apparatus according to the present invention, when the concentration measured based on the temperature rise characteristics of the liquid reducing agent or its precursor as a heat transfer medium is lower than the predetermined threshold, it is discriminated that the liquid reducing agent or its precursor is the different type of aqueous solution which does not function as the reducing agent. Further, when the different type discrimination is performed such that the liquid reducing agent or its precursor is the different type of aqueous solution, it is judged whether or not the different type discrimination is adequate, and only when the different type discrimination is adequate, the number of different type discriminating times is counted up based on the predetermined counted value. Then, when the number of different type discriminating times is equal to or larger than the first predetermined number of times, the different type discrimination is determined. At this time, since at least one of the predetermined counted value and the first predetermined number of times is dynamically set based on the level of the liquid reducing agent or its precursor in the reducing agent tank, the counting and/or the different type discrimination determination is performed, considering convection which is changed according to a level change. Therefore, regardless of a vehicle state, it is possible to discriminate with high precision whether or not the liquid reducing agent or its precursor is the different type of aqueous solution.

DESCRIPTION OF EMBODIMENTS

Hereunder is a detailed description of the present invention with reference to the accompanying drawings.

Figure 1:
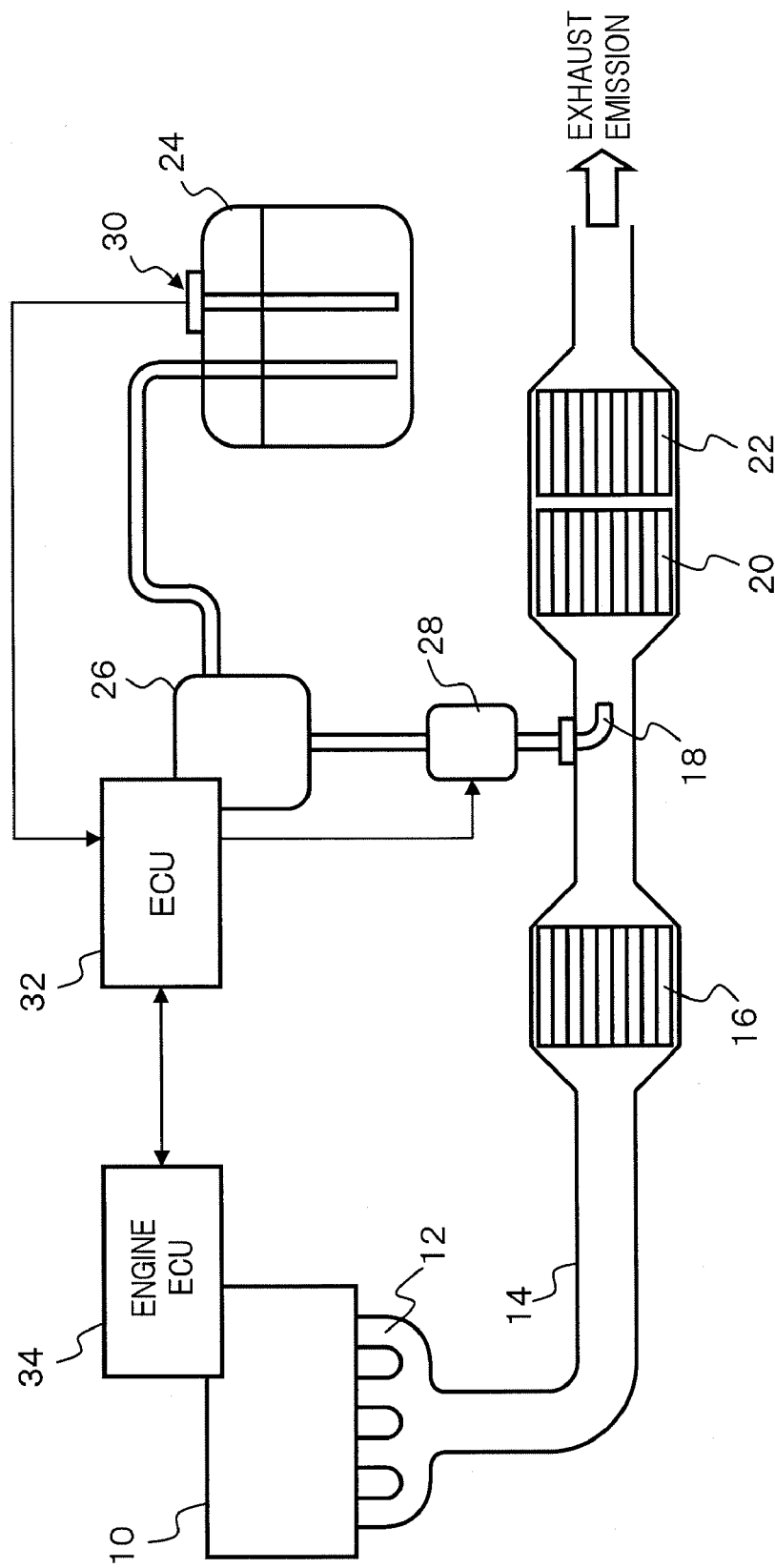
FIG. 1 is an entire configuration view illustrating one example of an exhaust emission purifying apparatus according to the present invention.

FIG. 1 illustrates an entire configuration of an exhaust emission purifying apparatus that reductively purifies $NO_x$ in the engine exhaust emission by using the urea aqueous solution which is a precursor of a liquid reducing agent.

In an exhaust pipe 14 connected to an exhaust manifold 12 of an engine 10, there are disposed, along a flow direction of the exhaust emission in the order, a nitrogen oxidation catalytic converter 16 which oxidizes nitrogen monoxide (NO) into nitrogen dioxide ($NO_2$), an injection nozzle 18 which injection-supplies the urea aqueous solution, a $NO_x$ reduction catalytic converter 20 which reductively purifies $NO_x$ using ammonia obtained by hydrolyzing the urea aqueous solution, and an ammonia oxidation catalytic converter 22 which oxidizes ammonia passed through the $NO_x$ reduction catalytic converter 20. On the other hand, the urea aqueous solution stored in a reducing agent tank 24 is supplied to the injection nozzle 18 via a pump module 26 that sucks the urea aqueous solution to pressure-feed it and a dosing module 28 that controls an injection flow amount of the urea aqueous solution.

In the exhaust emission purifying apparatus described above, the urea aqueous solution injection-supplied from the injection nozzle 18 is hydrolyzed by the exhaust heat and the water vapor in the exhaust emission, to be converted into ammonia. It is well-known that the converted ammonia reductively reacts with $NO_x$ in the exhaust emission in the $NO_x$ reduction catalytic converter 20 to be converted into water ($H_2O$) and nitrogen ($N_2$). At this time, in order to improve $NO_x$ purifying efficiency in the $NO_x$ reduction catalytic converter 20, NO is oxidized to $NO_2$ by the nitrogen oxidation catalytic converter 16, and a ratio between NO and $NO_2$ in the exhaust emission is improved to be appropriate for a reduction reaction. On the other hand, ammonia passed through the $NO_x$ reduction catalytic converter 20 is oxidized by the ammonia oxidation catalytic converter 22 disposed on the exhaust emission downstream side of the $NO_x$ reduction catalytic converter 20, and therefore, ammonia is prevented from being directly discharged into atmosphere.

Figure 2:
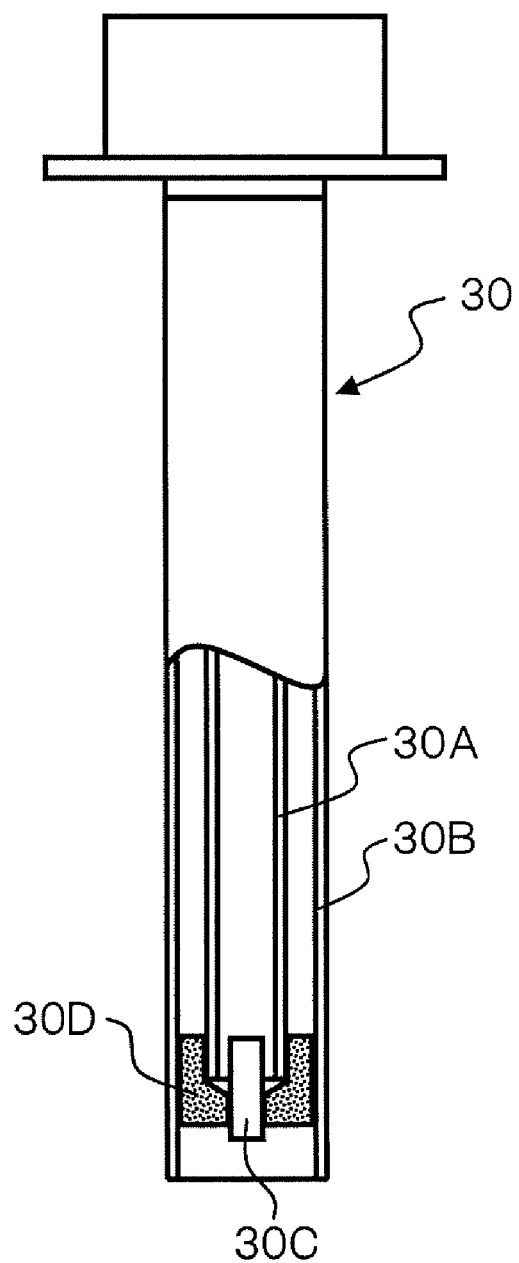
FIG. 2 is an explanatory view illustrating a sensor for measuring a level of a urea aqueous solution and a concentration thereof.
Figure 3:
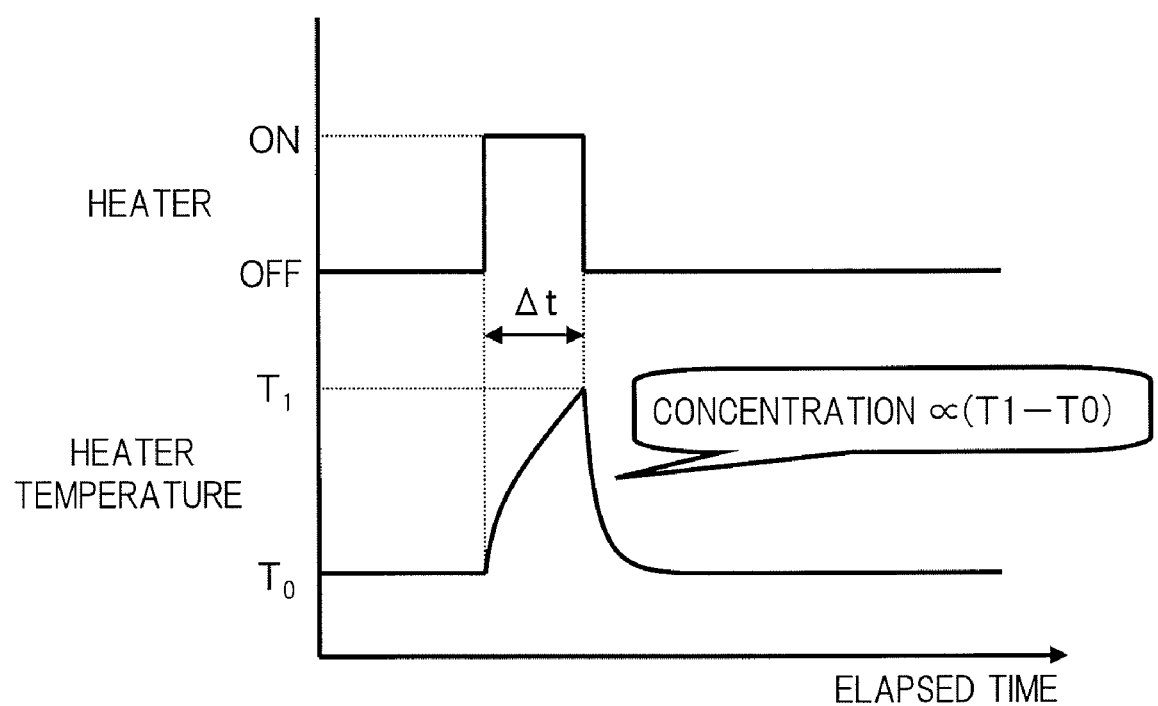
FIG. 3 is an explanatory view illustrating a measuring principle of the urea aqueous solution concentration.

To the reducing agent tank 24, a sensor 30 functioning as a level measuring device and a concentration measuring device is attached, for measuring the level of the urea aqueous solution and the concentration (urea concentration) thereof. As illustrated in FIG. 2, the sensor 30 is configured such that an inner electrode 30A and an outer electrode 30B each of which cross section is an annular shape, are hanged in concentric from a top wall of the reducing agent tank 24 toward a bottom wall thereof, to indirectly measure the level based on a change in electrostatic capacity between both of the electrodes. Further, the sensor 30 is configured such that a ceramics heater 30C (a heating element) which also serves as a temperature sensor is fixed to a tip end portion of the sensor 30, to indirectly measure the concentration, based on temperature rise characteristics ($T_1-T_0$) for when the ceramics heater 30C is operated for a predetermined time $\Delta t$, as illustrated in FIG. 3, that is, based on heat discharge characteristics obtained by using the urea aqueous solution as a heat transfer medium. At this time, it is also possible to indirectly measure the temperature of the urea aqueous solution based on a resistance change of the ceramics heater 30C. Incidentally, the reference sign 30D in the FIG. 2 is a holder for holding an approximately constant space between the inner electrode 30A and the outer electrode 30B while fixing the ceramics heater 30C.

Figure 4:
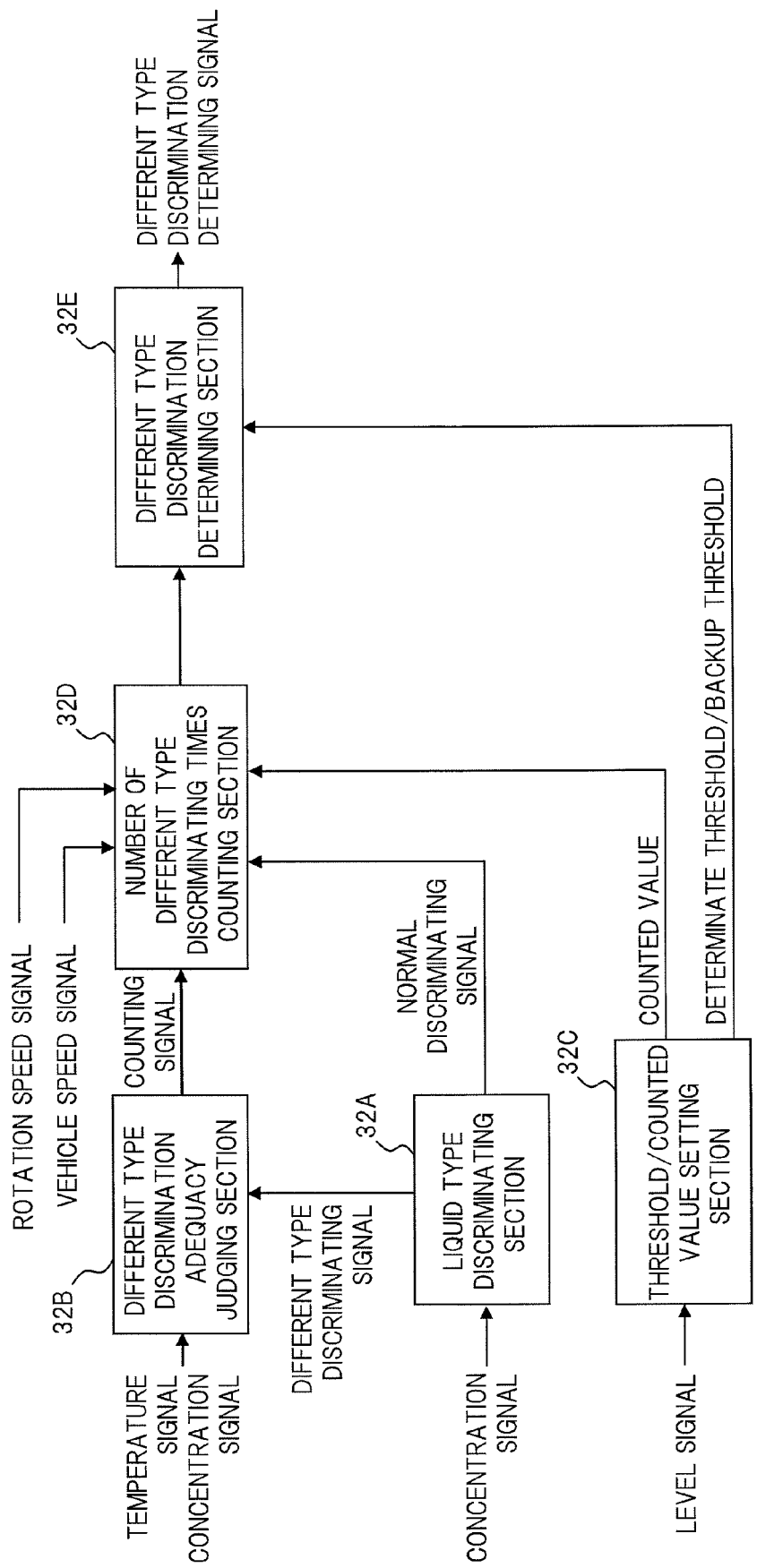
FIG. 4 is a block diagram illustrating various types of functions for performing liquid discrimination.

Output signals from the sensor 30, to be specific, a level signal, a concentration signal and a temperature signal, are input to a control unit 32 incorporating therein a computer. Further, to the control unit 32, an engine rotation speed signal, a vehicle speed signal, an ignition switch signal and the like are input from an engine control unit 34 which performs various types of controls on the engine 10 via CAN (Controller Area Network) or the like. Then, in the control unit 32, a control program stored in a ROM (Read Only Memory) or the like thereof is executed, so that a liquid type discriminating section 32A, a different type discrimination adequacy judging section 32B, a threshold/counted value setting section 32C, a number of different type discriminating times counting section 32D and a different type discrimination determining section 32E are each realized, as illustrated in FIG. 4.

Incidentally, in the present embodiment, the engine control unit 34 functions as a rotation speed detecting device and a vehicle speed detecting device. However, an engine rotation speed and a vehicle speed may be detected by known sensors. Further, the control program may be executed not only in the control unit 32 but also in the existing control unit such as the engine control unit 34 or the like.

The liquid type discriminating section 32A provides a different type discriminating process, and discriminates, at each predetermined time after an engine operation is started, whether a liquid stored in the reducing agent tank 24 is the urea aqueous solution or any different type of aqueous solution, based on the concentration signal, to thereby output a normal discriminating signal or a different type discriminating signal according to the discrimination result. The different type discrimination adequacy judging section 32B provides an adequacy judging process, and judges, when the different type discriminating signal is output, whether or not the different type discrimination is adequate based on the temperature signal and the concentration signal, to thereby output a counting signal representing that the number of different type discriminating times is to be counted, according to the judgment result. The threshold/counted value setting section 32C provides first and second setting processes, and dynamically sets a determination threshold which determines the different type discrimination and a backup threshold (to be described later in detail), and also a counted value counting the number of different type discriminating times, based on the level signal. The number of different type discriminating times counting section 32D provides first and second counting processes, a vehicle state judging process and also a resetting process, appropriately counts up the number of different type discriminating times and the number of backup times when the counting signal is output. The different type discrimination determining section 32E provides first and second different type discrimination determining processes, and determines the different type discrimination, to thereby output a different type discrimination determining signal, when the number of different type discriminating times is equal to or larger than the determination threshold (the first predetermined number of times) or when the number of backup times becomes equal to or larger than the backup threshold (the second predetermined number of times) which is larger than the determination threshold.

Next, there will be described various types of functions for the liquid discrimination referring to flowcharts in FIG. 5 to FIG. 9.

Figure 5:
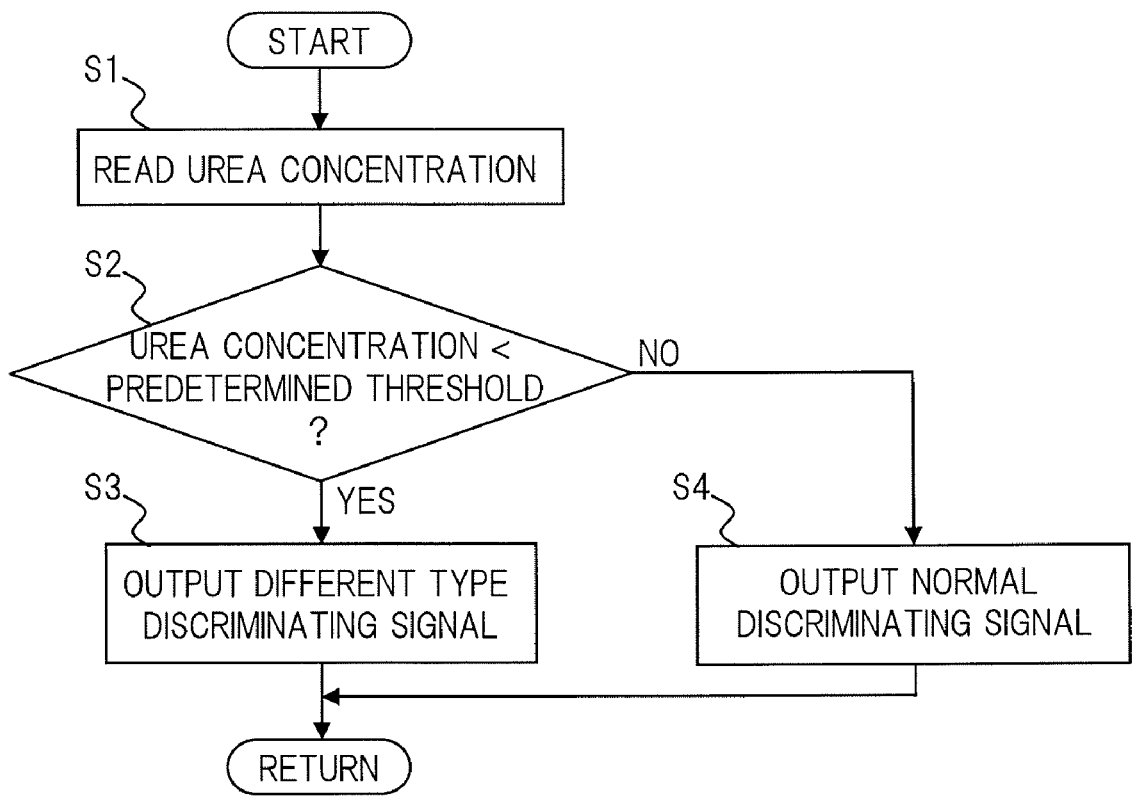
FIG. 5 is a flowchart illustrating a process content of a liquid type discriminating section.

In FIG. 5 illustrating a process content of the liquid type discriminating section 32A, in step 1 (to be abbreviated as "S1" in the figure, and the same rule will be applied to the subsequent steps), the concentration signal is read from the sensor 30 as the urea concentration of the liquid stored in the reducing agent tank 24.

In step 2, it is judged whether or not the urea concentration is lower than a predetermined threshold. Here, the predetermined threshold is for defining between the urea aqueous solution and the different type of aqueous solution, and is set at a lower limit threshold which may not be measured even if some convection is generated, for example if the liquid in the reducing agent tank 24 is the normal urea aqueous solution. Then, when the urea concentration is lower than the predetermined threshold (Yes), the routine proceeds to step 3 where the different type discriminating signal is output. On the other hand, when the urea concentration is equal to or higher than the predetermined threshold (No), the routine proceeds to step 4 where the normal discriminating signal is output.

According to the process content described above, the urea concentration of the liquid stored in the reducing agent tank 24 is read at each predetermined time after the engine operation is started. Then, when the urea concentration is lower than the predetermined threshold, it is discriminated that the liquid is the different type of aqueous solution, and the different type discriminating signal representing the discrimination result is output. On the other hand, when the urea concentration is equal to or higher than the predetermined threshold, it is discriminated that the liquid is the urea aqueous solution, and the normal discriminating signal representing the discriminating result is output.

Figure 6:
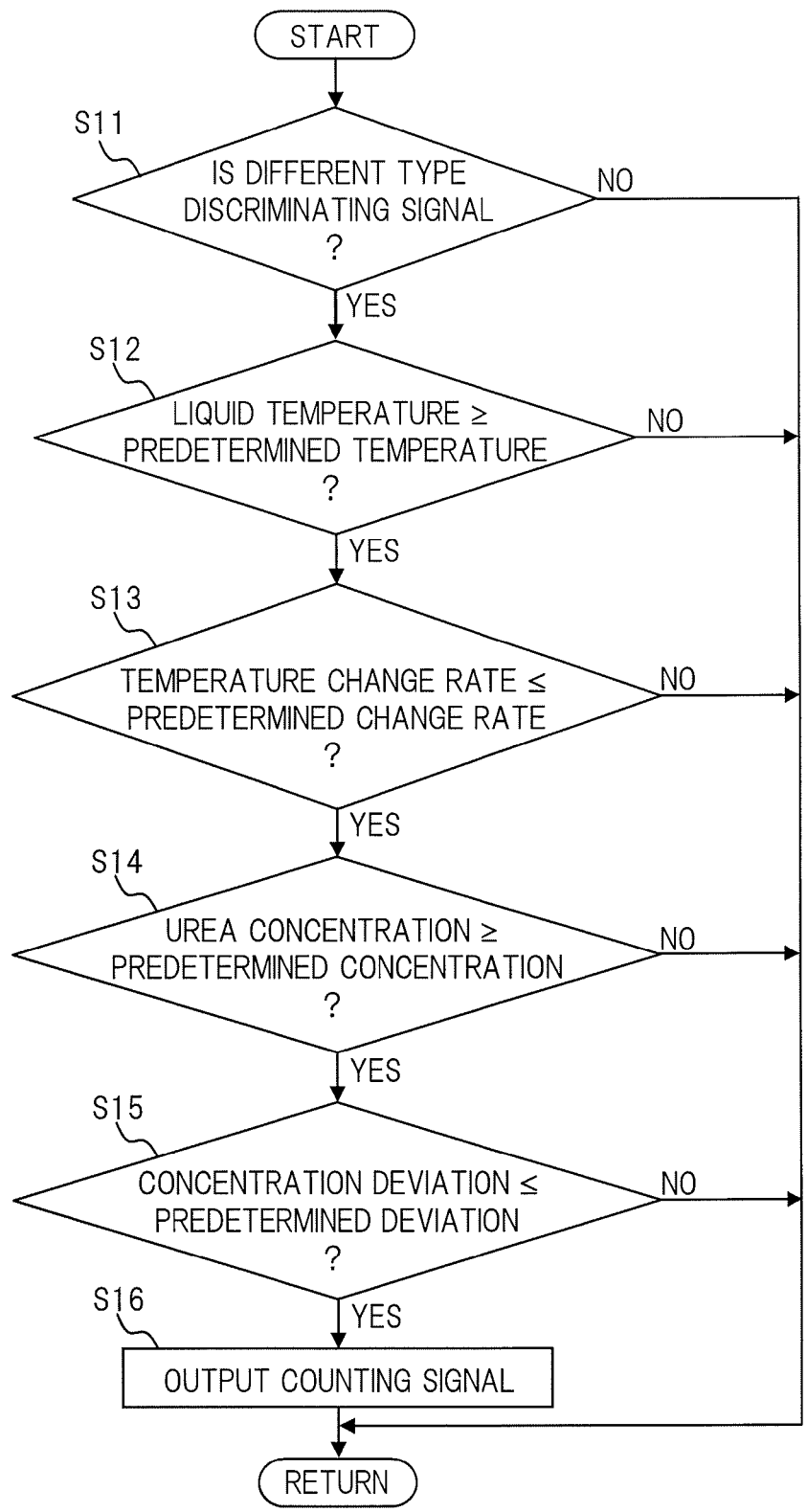
FIG. 6 is a flowchart illustrating a process content of a different type discrimination adequacy judging section.

In FIG. 6 illustrating a process content of the different type discrimination adequacy judging section 32B, in step 11, it is judged whether or not the different type discriminating signal is output. Then, when the different type discriminating signal is output (Yes), the routine proceeds to step 12, whereas when the different type discriminating signal is not output (No), the present routine is terminated.

In step 12, it is judged, based on the temperature signal from the sensor 30, whether or not the liquid temperature immediately before the ceramics heater 30C is operated, namely, the temperature of the ceramics heater 30C, is equal to or higher than the predetermined temperature. Here, the predetermined temperature is for judging whether or not at least a portion of the liquid is frozen, so that the concentration measuring precision is degraded, and is set at the temperature slightly higher than a freezing point of the urea aqueous solution. Then, when the liquid temperature is equal to or higher than the predetermined temperature (Yes), the routine proceeds to step 13, whereas when the liquid temperature is lower than the predetermined temperature (No), the present routine is terminated.

In step 13, it is judged, based on the temperature signal from the sensor 30, whether or not a temperature change rate associated with the operation of the ceramics heater 30C, namely, a temperature change per unit time is equal to or lower than a predetermined change rate. Here, the predetermined change rate is for judging whether or not strong convection is generated depending on the temperature change, and therefore is set at a change rate which is not available in a state where convection is relatively weak. Then, when the temperature change rate is equal to or lower than the predetermined change rate (Yes), the routine proceeds to step 14, whereas when the temperature change rate is higher than the predetermined change rate (No), the present routine is terminated.

In step 14, it is judged, based on the concentration signal from the sensor 30, whether or not the urea concentration is equal to or higher than the predetermined concentration. Here, the predetermined concentration is for judging whether or not strong convection is generated in the liquid depending on a state where the urea concentration measured by the sensor 30 is significantly low, and is set at the low concentration which may not be measured even if some convection is generated. Then, when the urea concentration is equal to or higher than the predetermined concentration (Yes), the routine proceeds to step 15, whereas when the urea concentration is lower than the predetermined concentration (No), the present routine is terminated.

In step 15, it is judged, based on the concentration signal from the sensor 30, whether or not the deviation (to be referred to concentration deviation hereunder) between the previously measured urea concentration and the presently measured urea concentration is equal to or smaller than the predetermined deviation. Here, the predetermined deviation is for judging whether or not strong convection is generated in the liquid depending on a state where the urea concentration is significantly changed, and is set at the deviation of a range which does not change even if some convection is generated. Then, when the concentration deviation is equal to or smaller than the predetermined deviation (Yes), the routine proceeds to step 16 where the counting signal is output, whereas when the concentration deviation is larger than the predetermined deviation (No), the present routine is terminated.

According to the process content described above, when the different type discriminating signal is output, when the liquid temperature is equal to or higher than the predetermined temperature, the temperature change rate of the liquid is equal to or lower than the predetermined change rate, the urea concentration is equal to or higher than the predetermined concentration, and the concentration deviation is equal to or smaller than the predetermined deviation, it is judged that the different type discrimination is adequate. Therefore, in the state where the liquid temperature is low and at least a portion of the liquid is frozen, and in the state where strong convection is generated in the liquid, so that heat discharge characteristics are changed, it is not judged that the different type discrimination is adequate, and therefore, it is possible to perform the high reliable counting of the number of different type discriminating times.

Figure 7:
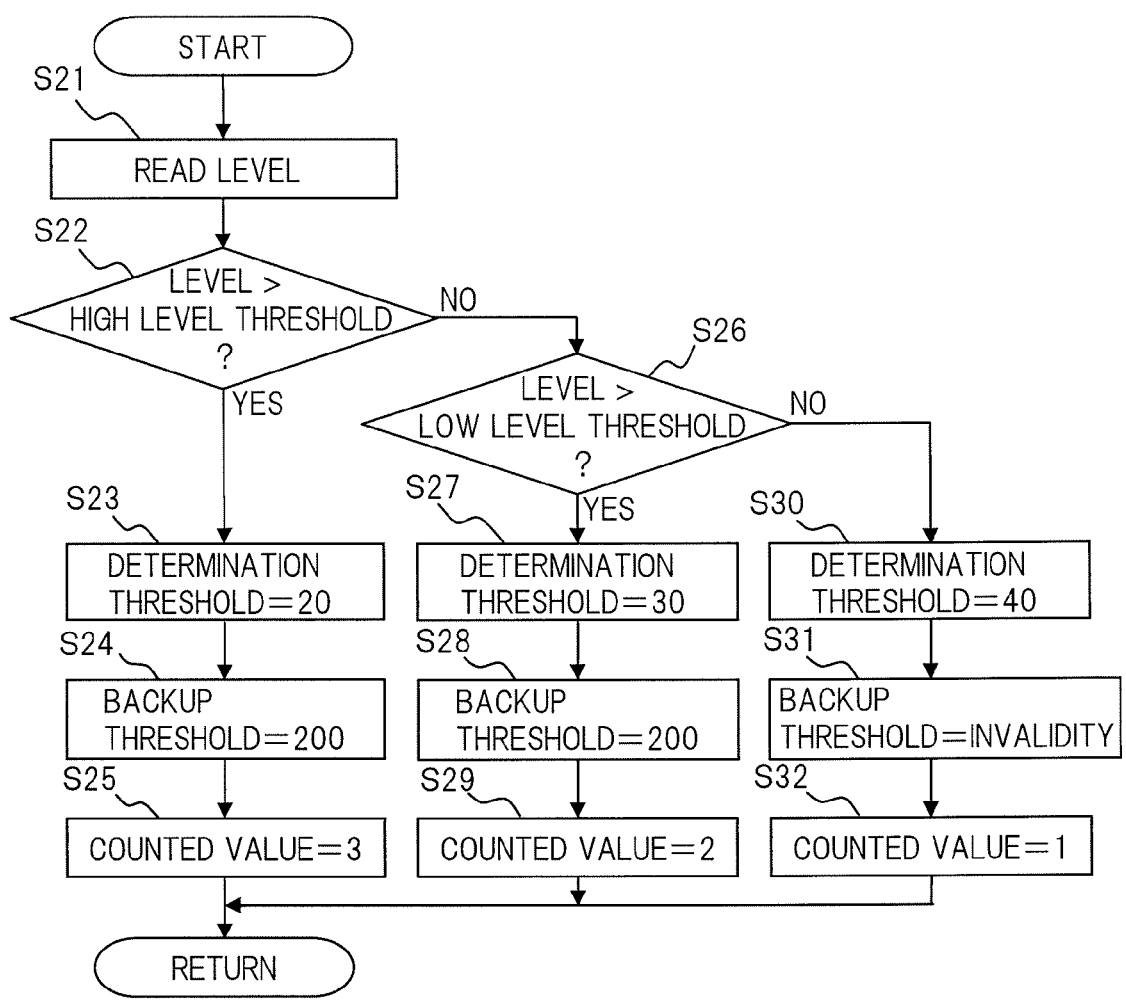
FIG. 7 is a flowchart illustrating a process content of a threshold/counted value setting section.

In FIG. 7 illustrating a process content of the threshold/counted value setting section 32C, in step 21, the level signal is read from the sensor 30 as the level of the liquid stored in the reducing agent tank 24.

In step 22, it is judged whether or not the level is higher than a high level threshold. Here, the high level threshold is for judging whether or not a liquid residual amount is sufficient, and is set, for example, at ½ of the full level in the reducing agent tank 24. Then, when the level is higher than the high level threshold (Yes), the routine proceeds to step 23, whereas when the level is equal to or lower than the high level threshold (No), the routine proceeds to step 26.

In step 23, 20 is set as the determination threshold.

In step 24, 200 is set as the backup threshold.

In step 25, 3 is set as the counted value.

In step 26, it is judged whether or not the level is higher than a low level threshold (predetermined level). Here, the low level threshold is for judging whether or not the liquid residual amount is small, and is set, for example, at the level in a state where the reducing agent tank 24 is approximately empty. Then, when the level is higher than the low level threshold (Yes), the routine proceeds to step 27, whereas when the level is equal to or lower than the low level threshold (No), the routine proceeds to step 30.

In step 27, 30 is set as the determination threshold.

In step 28, 200 is set as the backup threshold.

In step 29, 2 is set as the counted value.

In step 30, 40 is set as the determination threshold.

In step 31, the backup threshold is set at invalidity, for example, infinity.

In step 32, 1 is set as the counted value.

According to the process content described above, the determination threshold, the backup threshold and the counted value are dynamically set according to the liquid level. Namely, as the level of the liquid stored in the reducing agent tank 24 is lowered, stronger convection becomes susceptible to be generated relative to the same vibration. Therefore, the determination threshold, the backup threshold and the counted value are appropriately set according to the liquid level, so that the different type discrimination determining precision in each level can be improved. Further, when the level is equal to or lower than the low level threshold, since the backup threshold is set at infinity, in a process of the different type discrimination determining section 32E (to be described later), it is possible to inhibit the different type discriminating determination in the state where strong convection is generated.

Incidentally, specific numerical values of the determination threshold, the backup threshold and the counted value illustrated in FIG. 7 are illustrative only, and are to be set in optimum through a test or the like. However, it is desirable that the determination threshold is set to be gradually increased as the liquid level is lowered, and on the other hand, the counted value is set to be gradually decreased as the liquid level is lowered.

Figure 8:
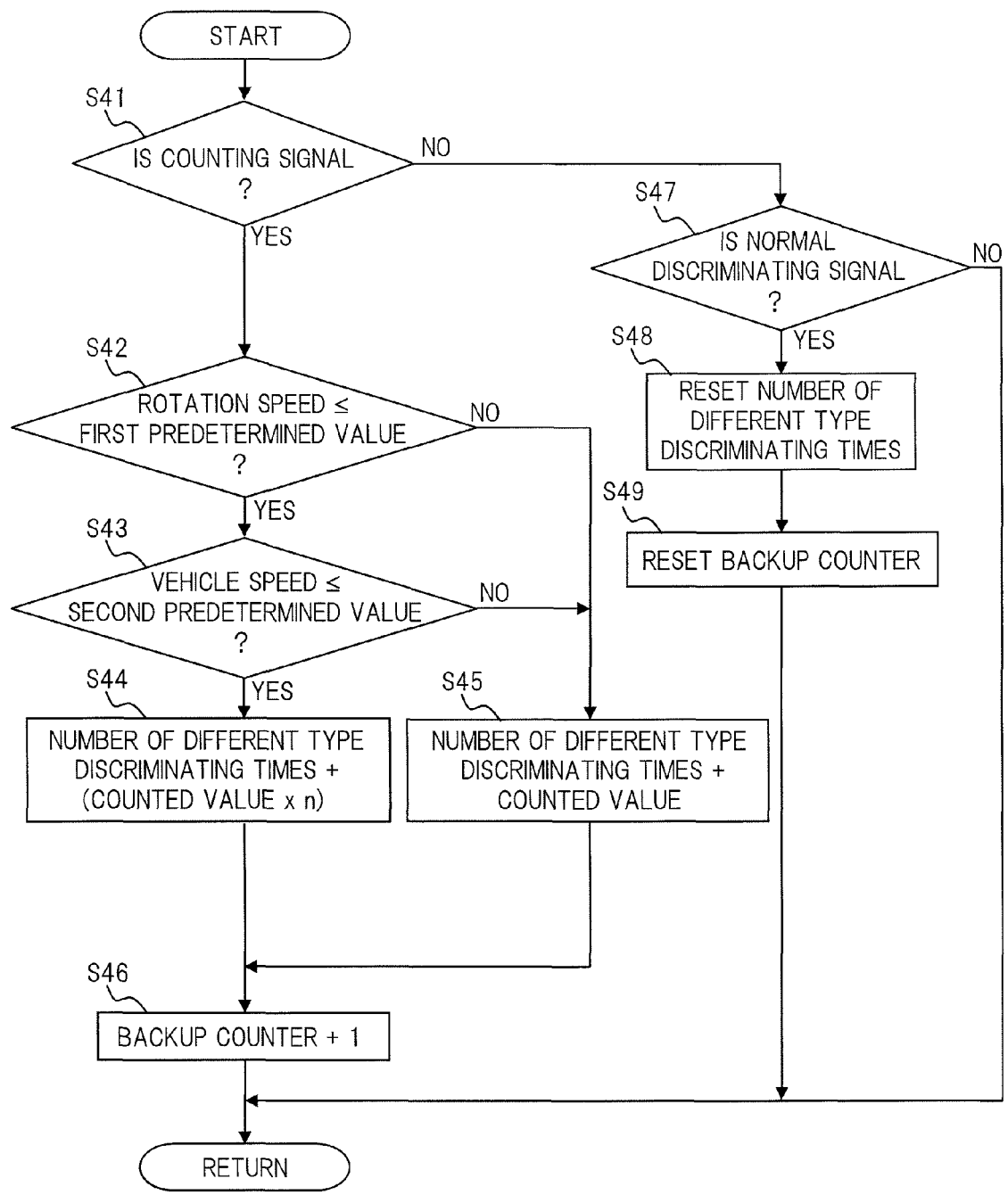
FIG. 8 is a flowchart illustrating a process content of a number of different type discriminating times counting section.

In FIG. 8 illustrating a process content of the number of different type discriminating times counting section 32D, in step 41, it is judged whether or not the counting signal is output. Then, when the counting signal is output (Yes), the routine proceeds to step 42, whereas when the counting signal is not output (No), the routine proceeds to step 47.

In step 42, it is judged whether or not the engine rotation speed is equal to or smaller than a first predetermined value. Here, the first predetermined value is one of thresholds which judge whether or not the vehicle makes a stop, and is set, for example, around an idling rotation speed of the engine 10. Then, when the engine rotation speed is equal to or smaller than the first predetermined value (Yes), the routine proceeds to step 43, whereas when the engine rotation speed is larger than the first predetermined value (No), the routine proceeds to step 45.

In step 43, it is judged whether or not the vehicle speed is equal to or smaller than a second predetermined value. Here, the second predetermined value is the other threshold which judges whether or not the vehicle makes a stop, and is set, for example, at a minimum value of a vehicle speed detectable range. Then, when the vehicle speed is equal to or smaller than the second predetermined value (Yes), the routine proceeds to step 44, whereas when the vehicle speed is larger than the second predetermined value (No), the routine proceeds to step 45.

In step 44, it is judged that the vehicle makes a stop, and a value obtained by multiplying a natural number equal to or larger than 2 by the counted value set by the threshold/counted value setting section 32C is added to the number of different type discriminating times, to thereby count up the number of different type discriminating times.

In step 45, it is judged that the vehicle is moving, and the counted value is added to the number of different type discriminating times, to thereby count up the number of different type discriminating times.

In step 46, 1 is added to a backup counter which counts up the number of times at which the different type discrimination is consecutively performed.

In step 47, it is judged whether or not the normal discriminating signal is output. Then, when the normal discriminating signal is output (Yes), the routine proceeds to step 48, whereas when the normal discriminating signal is not output (No), the present routine is terminated.

In step 48, the number of different type discriminating times is reset.

In step 49, the backup counter is reset.

According to the process content described above, at each time when the counting signal is output, the number of different type discriminating times is counted up based on a predetermined counted value set by the threshold/counted value setting section 32C. At this time, since the number of different type discriminating times is counted up based on the counted value according to the liquid level in the reducing agent tank 24, it is possible to perform the counting taking the convection generated state in the liquid into consideration. Further, when the vehicle makes a stop, the number of different type discriminating times is counted up based on the value obtained by multiplying the natural number equal to or larger than 2 by the counted value. Therefore, in a state where convection generated in the liquid in the reducing agent tank 24 is weak or no convection is generated, what is called weighting is performed on the counted value, so that the different type discrimination can be determined in a short time while maintaining the different type discriminating precision. Further, at each time when the counting signal is output, 1 is added to the backup counter regardless of the adequacy of the different type discrimination.

On the other hand, when the normal discriminating signal is output, since probability that the liquid is the urea aqueous solution is high, in order to count up the number of different type discriminating times from the top, the number of different type discriminating times and the backup counter are each reset. Therefore, since the counting of the number of different type discriminating times is not progressed in the state of high probability that the liquid is not the different type of aqueous solution, it is possible to improve the different type discriminating determining precision.

Figure 9:
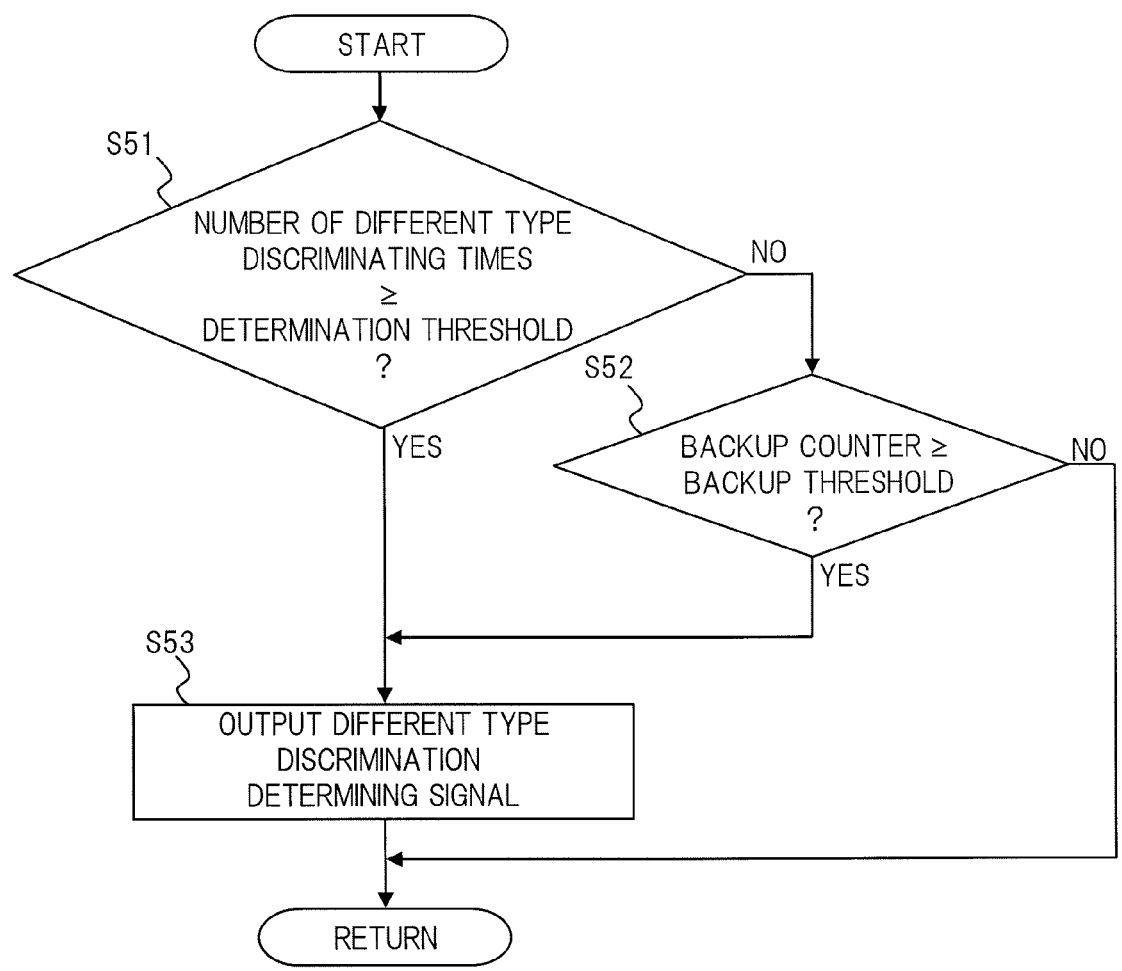
FIG. 9 is a flowchart illustrating a process content of a different type discrimination determining section.

In FIG. 9 illustrating a process content of the different type discrimination determining section 32E, in step 51, it is judged whether or not the number of different type discriminating times is equal to or larger than the determination threshold. Then, when the number of different type discriminating times is equal to or larger than the determination threshold (Yes), the routine proceeds to step 53, whereas when the number of different type discriminating times is smaller than the determination threshold (No), the routine proceeds to step 52.

In step 52, it is judged whether or not the backup counter is equal to or larger than the backup threshold. Then, when the backup counter is equal to or larger than the backup threshold (Yes), the routine proceeds to step 53, whereas when the backup counter is smaller than the backup threshold (No), the present routine is terminated.

In step 53, the different type discrimination determining signal is output.

According to the process content described above, when the number of different type discriminating times is equal to or larger than the determination threshold, or when the backup counter is equal to or larger than the backup threshold, the different type discrimination is determined, and the different type discrimination determining signal representing that the different type discrimination is determined, is output.

Figure 10:
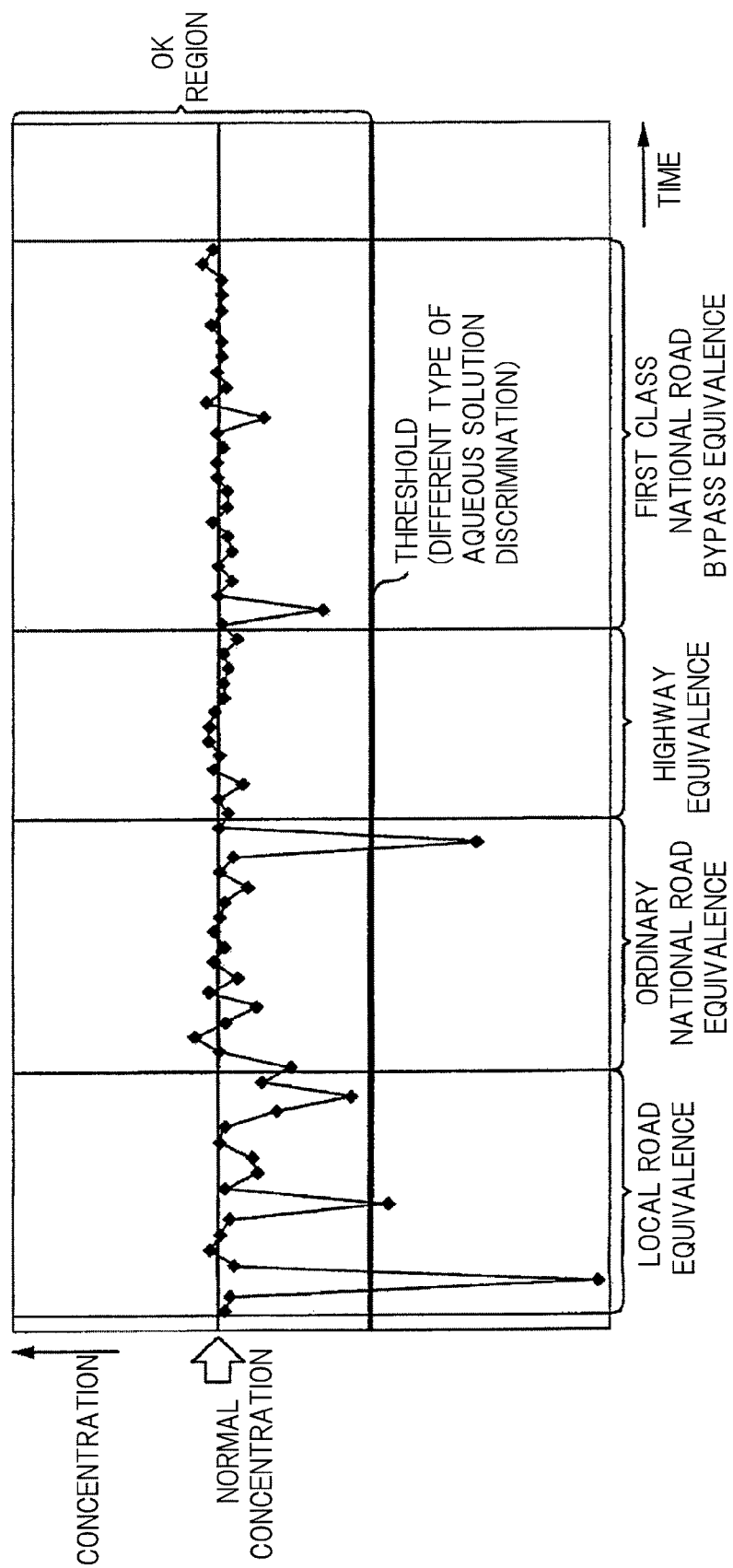
FIG. 10 is a characteristic diagram illustrating a measured value of the urea concentration during vehicle running.

Namely, when convection is generated in the liquid stored in the reducing agent tank 24, since the heat generated by the ceramics heater 30C of the sensor 30 is carried on the convection, the temperature rise characteristics associated with the heat discharge characteristics are changed, so that the concentration measuring precision is degraded. However, after the urea concentration measured by the sensor 30 is actually measured, as illustrated in FIG. 10, it could be found a fact that when the liquid is the normal urea aqueous solution, it is rare that the urea concentration is consecutively lower than the predetermined threshold for many times even if convection is generated.

Therefore, when the urea concentration is lower than the predetermined threshold, it is judged that the probability that the liquid is the different type of aqueous solution is high, to thereby count up the number of different type discriminating times. On the other hand, when the number of different type discriminating times is equal to or larger than the determination threshold, the different type discrimination is determined, so that the different type discrimination can be performed with high precision regardless of a vehicle state. At this time, the adequacy of the different type discrimination is judged, and only when the different type discrimination is adequate, the number of different type discriminating times is counted up, so that the counting in the state where strong convection is generated in the liquid can be inhibited, to thereby improve the different type discriminating precision. Further, since the counted value of the number of different type discriminating times and the determination threshold thereof are dynamically set according to the liquid level in the reducing agent tank 24, by appropriately setting them, the different type discriminating process in each level can be tuned, to thereby can further improve the different type discriminating precision. Further, when the backup counter is equal to or larger than the backup threshold, since the different type discrimination is determined regardless of the number of different type discriminating times, it is possible to prevent that the different type discrimination never be determined.

When it is judged that the different type discrimination is inadequate, the counting in a state where the liquid discrimination is difficult to be performed might be performed in the previous counting process of the number of different type discriminating times. Therefore, a counted value subtracting process described below is further executed, so that the different type discriminating precision can be further improved. Incidentally, in the counted value subtracting process, a process relating to the adequacy judgment is same as the process content illustrated in FIG. 6, and therefore, the counted value subtracting process may be incorporated into the process content shown in FIG. 6.

Figure 11:
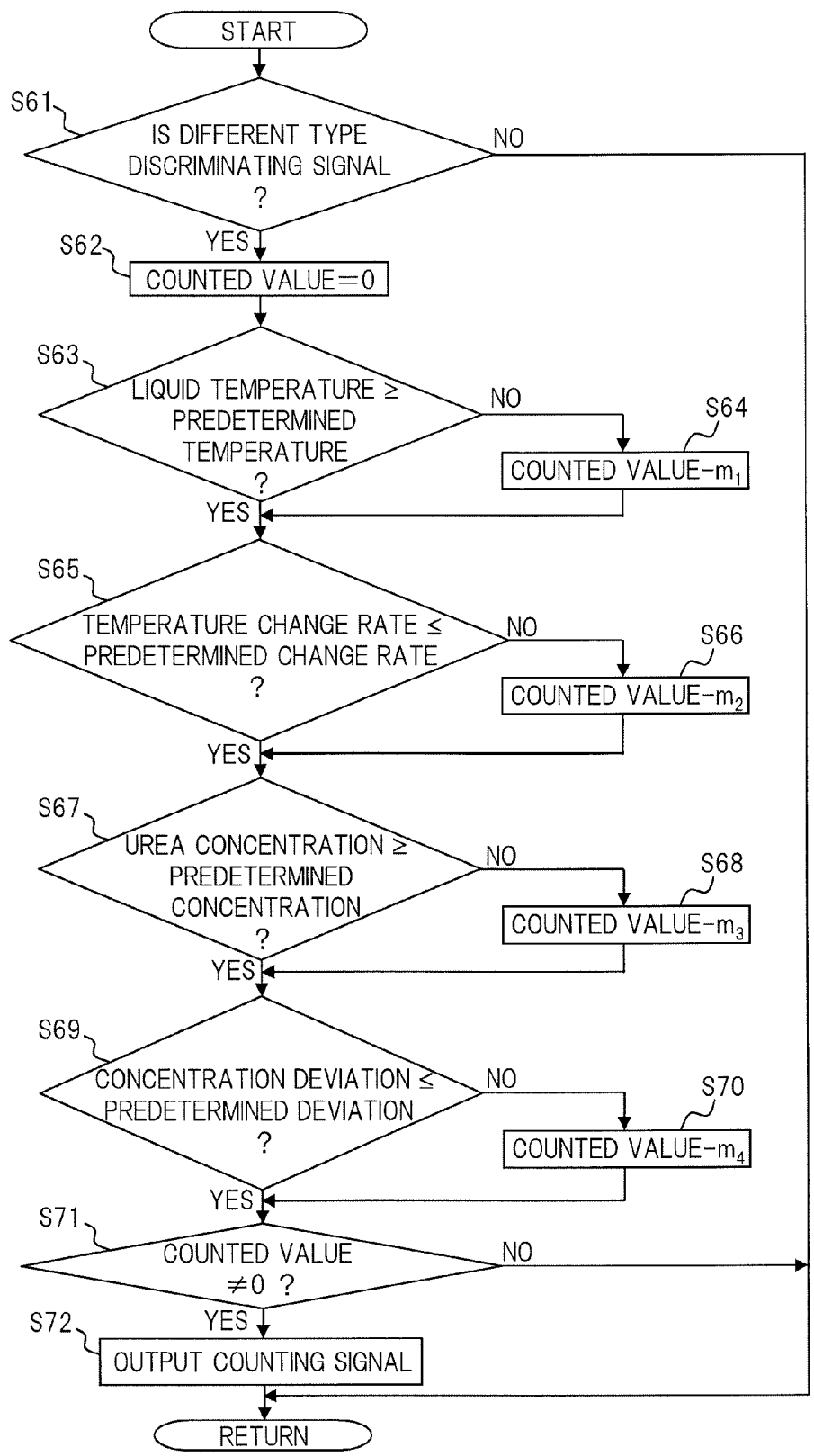
FIG. 11 is a flowchart illustrating a counted value subtracting process.

In FIG. 11 illustrating the counted value subtracting process as a third counting process, in step 61, it is judged whether or not the different type discriminating signal is output. Then, when the different type discriminating signal is output (Yes), the routine proceeds to the step 62, whereas when the different type discriminating signal is not output (No), the present routine is terminated.

In step 62, 0 is set as the counted value.

In step 63, it is judged, based on the temperature signal from the sensor 30, whether or not the liquid temperature immediately before the operation of the ceramics heater 30C is equal to or higher than the predetermined temperature. Then, when the liquid temperature is equal to or higher than the predetermined temperature (Yes), the routine proceeds to step 65. On the other hand, when the liquid temperature is lower than the predetermined temperature (No), the routine proceeds to step 64 where a predetermined value $m_1$ is subtracted from the counted value.

In step 65, it is judged, based on the temperature signal from the sensor 30, whether or not the temperature change rate associated with the operation of the ceramics heater 30C is equal to or lower than the predetermined change rate. Then, when the temperature change rate is equal to or lower than the predetermined change rate (Yes), the routine proceeds to step 67. On the other hand, when the temperature change rate is higher than the predetermined change rate (No), the routine proceeds to step 66 where a predetermined value $m_2$ is subtracted from the counted value.

In step 67, it is judged, based on the concentration signal from the sensor 30, whether or not the urea concentration is equal to or higher than the predetermined concentration. Then, when the urea concentration is equal to or higher than the predetermined concentration (Yes), the routine proceeds to step 69. On the other hand, when the urea concentration is lower than the predetermined concentration (No), the routine proceeds to step 68 where a predetermined value $m_3$ is subtracted from the counted value.

In step 69, it is judged, based on the concentration signal from the sensor 30, whether or not the concentration deviation is equal to or smaller than the predetermined deviation. Then, when the concentration deviation is equal to or smaller than the predetermined deviation (Yes), the routine proceeds to step 71. On the other hand, when the concentration deviation is larger than the predetermined deviation (No), the routine proceeds to step 70 where a predetermined value $m_4$ is subtracted from the counted value.

In step 71, it is judged whether or not the counted value is not 0, in fact, whether or not the different type discrimination is inadequate. Then, when the counted value is not 0 (Yes), the routine proceeds to step 72, whereas when the counted value is 0 (No), the present routine is terminated.

In step 72, the counting signal is output.

According to the counted value subtracting process described above, when it is judged that the different type discrimination is inadequate, since the counting signal which subtracts the predetermined number of times from the number of different type discriminating times is output, the counting in the state where the liquid discrimination is difficult to be performed is cancelled, so that the discriminating precision can be improved.

Incidentally, in the process of the different type discrimination determining section 32E illustrated in FIG. 9, when the different type discrimination determining signal is output, in order to notify the output of the different type discrimination determining signal to a vehicle driver, an alarm, such as a buzzer, a warning light or the like, may be operated. Here, a process of operating the alarm corresponds to first and second warning processes. Thus, the vehicle driver can understand in early stage that a liquid which is not the urea aqueous solution is in the reducing agent tank 24, and performs a proper process such as the exchange of the liquid, so that a function as the exhaust emission purifying apparatus can be achieved.

Further, when the operation of the engine 10 is stopped, the number of different type discriminating times is written into a nonvolatile memory such as EEPROM (Electrically Erasable Programmable Read Only Memory), whereas when the operation of the engine 10 is started, the number of different type discriminating times may be read from the nonvolatile memory. Thus, since the number of different type discriminating times before the operation start of the engine 10 is taken over to the next counting process, it is unnecessary to perform the counting process from the top at each time when the operation of the engine 10 is started, and consequently, it is possible to determine the different type discrimination in a short time. Here, the process of writing the number of different type discriminating times into the nonvolatile memory and the process of reading the number of different type discriminating times from the nonvolatile memory correspond to a number of times writing process and a number of times reading process, respectively.

Consequently, even if a sensor which indirectly measures the urea concentration according to the heat discharge characteristics is mounted on the moving vehicle, it is possible to discriminate with high precision whether or not the liquid is the different type of aqueous solution.

Incidentally, in the present embodiment, in order to measure the level of the liquid stored in the reducing agent tank 24, the concentration thereof and the temperature thereof, the sensor 30 in which the level measuring device, the concentration measuring device and the temperature measuring device are integrated is used. However, the level, the urea concentration and the liquid temperature may be measured by using such as a known level gauge, a known concentration meter, and a known thermometer, respectively. Further, in the present embodiment, at least one of the determination threshold and the backup threshold may be set according to the liquid level, or both of them may be consecutively set according to the liquid level.

Further, the present invention can be applied not only to the exhaust emission purifying apparatus using the urea aqueous solution as the precursor of the liquid reducing agent, but also to those apparatuses using ammonia, or light oil, gasoline, kerosene or the like which mainly contain hydrocarbon, according to the $NO_x$ reductive-purification reaction in the $NO_x$ reduction catalytic converter.

REFERENCE SIGNS LIST

10 . . . engine, 20 . . . $NO_x$ reduction catalytic converter, 24 . . . reducing agent tank, 30 . . . sensor, 30A . . . inner electrode, 30B . . . outer electrode, 30C . . . ceramics heater, 32 . . . ECU, 32A . . . liquid type discriminating section, 32B . . . different type discrimination adequacy judging section, 32C . . . threshold/counted value setting section, 32D . . . number of different type discriminating times counting section, 32E . . . liquid type determining section, 34 . . . engine ECU It should be appreciated that the entire contents of Japanese Patent Application No. 2006-278242, filed on Oct. 12, 2006, on which the convention priority is claimed is incorporated herein by reference.

It should also be understood that many modifications and variations of the described embodiments of the invention will occur to a person having an ordinary skill in the art without departing from the spirit and scope of the present invention as claimed in the appended claims.

What is claimed is:

1. An exhaust emission purifying apparatus for engine comprising:
    a reducing agent tank that stores a liquid reducing agent or its precursor;
    a reduction catalytic converter that reductively purifies nitrogen oxides in exhaust emission by using the liquid reducing agent or its precursor in the reducing agent tank;
    a level measuring device that measures a level of the liquid reducing agent or its precursor in the reducing agent tank;
    a concentration measuring device that measure a concentration of the liquid reducing agent or its precursor based on temperature rise characteristics of a heating element obtained by operating the heating element disposed in the reducing agent tank for a predetermined time; and
    a control unit incorporating therein a computer, wherein the control unit executes:
    a different type discriminating process of discriminating that the liquid reducing agent or its precursor is any different type of aqueous solution which does not function as a reducing agent when the concentration measured by the concentration measuring device is lower than a predetermined threshold;
    an adequacy judging process of judging, based on a temperature of the heating element and a temperature change rate thereof, and also, the concentration measured by the concentration measuring device, whether or not the different type discrimination is adequate, when it is discriminated in the different type discriminating process that the liquid reducing agent or its precursor is the different type of aqueous solution;
    a first counting process of counting up the number of different type discriminating times based on a predetermined counted value when it is judged in the adequacy judging process that the different type discrimination is adequate;
    a first different type discrimination determining process of determining the different type discrimination, when the number of different type discriminating times counted in the first counting process is equal to or larger than the first predetermined number of times; and a first setting process of dynamically setting at least one of the predetermined counted value and the first predetermined number of times based on the level measured by the level measuring device.

2. The apparatus according to claim 1, wherein the first setting process sets the predetermined counted value to become smaller gradually as the level is lowered.

3. The apparatus according to claim 1, wherein the first setting process sets the first predetermined number of times to become larger gradually as the level is lowered.

4. The apparatus according to claim 1, wherein the control unit further executes a resetting process of resetting the number of different type discriminating times, when it is discriminated in the different type discriminating process that the liquid reducing agent or its precursor is not the different type of aqueous solution.

5. The apparatus according to claim 1, wherein the adequacy judging process judges that the different type discrimination is adequate, when the temperature immediately before the operation of the heating element is equal to or higher than a predetermined temperature, the temperature change rate associated with the operation of the heating element is equal to or lower than a predetermined change rate, the concentration is equal to or higher than a predetermined concentration which is lower than the predetermined threshold, and also a deviation between a previously measured concentration and a presently measured concentration is equal to or smaller than a predetermined deviation.

6. The apparatus according to claim 1, wherein the control unit further executes a first warning process of operating an alarm, when the different type discrimination is determined in the first different type discrimination determining process.

7. The apparatus according to claim 1, wherein the control unit further executes:
a third counting process of subtracting a predetermined number of times from the number of different type discriminating times, when it is judged in the adequacy judging process that the different type discrimination is inadequate.

8. The apparatus according to claim 1, wherein the control unit further executes:
a number of times writing process of writing the number of different type discriminating times into a nonvolatile memory, when an engine operation is stopped; and
a number of times reading process of reading the number of different type discriminating times from the nonvolatile memory, when the engine operation is started.

9. The apparatus according to claim 1, wherein the control unit further executes:
a second counting process of counting the number of times at which the liquid reducing agent or its precursor is consecutively discriminated to be the different type of aqueous solution in the different type discriminating process; and
a second different type discrimination determining process of determining the different type discrimination, when the number of times counted in the second counting process is equal to or larger than a second predetermined number of times which is larger than the first predetermined number of times.

10. The apparatus according to claim 9, wherein the control unit further executes a second setting process of dynamically setting the second predetermined number of times based on the level measured by the level measuring device.

11. The apparatus according to claim 10, wherein the second setting process sets the second predetermined number of times at infinite, when the level is lower than a predetermined level.

12. The apparatus according to claim 9, wherein the control unit further executes a second warning process of operating an alarm, when the different type discrimination is determined in the second different type discrimination determining process.

13. The apparatus according to claim 1, wherein the control unit further executes a vehicle state judging process of judging whether a vehicle is running or makes a stop, and
the first counting process counts up the number of different type discriminating times based on a value obtained by multiplying a natural number equal to or larger than 2 by the predetermined counted value, when it is judged in the vehicle state judging process that the vehicle makes a stop.

14. The apparatus according to claim 13, further comprising:
a rotation speed detecting device that detects a rotation speed of the engine; and
a vehicle speed detecting device that detects a vehicle speed, wherein
the vehicle state judging process judges that the vehicle makes a stop in a state where the rotation speed detected by the rotation speed detecting device is equal to or smaller than a first predetermined value, and also, the vehicle speed detected by the vehicle speed detecting device is equal to or smaller than a second predetermined value, and while, judges that the vehicle is running in other states.

* * * * *